March 9, 1926.

R. D. HELLER

SCREENING DEVICE

Filed April 25, 1925

1,575,991

INVENTOR
Richard D. Heller
BY
ATTORNEYS

Patented Mar. 9, 1926.

1,575,991

UNITED STATES PATENT OFFICE.

RICHARD D. HELLER, OF BOISE, IDAHO.

SCREENING DEVICE.

Application filed April 25, 1925. Serial No. 25,905.

*To all whom it may concern:*

Be it known that I, RICHARD D. HELLER, a citizen of the United States of America, and resident of the city of Boise, in the county of Ada and State of Idaho, have invented certain new and useful Improvements in Screening Devices, of which the following is a specification.

My invention relates to seed screening devices adapted for handling irrigation water so as to prevent distribution of noxious seeds upon the irrigated land.

The object of my invention is to produce a machine for this purpose which shall have a capacity for handling large quantities of water while at the same time effectively retaining all weed seeds, and one which may be easily cleaned of the weed seeds which have been collected.

A further object is to produce a device of this kind which shall be cheap in cost, and one which is dependable for continuous and reliable service.

The invention consists essentially of a device which is designed for separating the greater part of the water from the seeds and discharging the same directly into the receiving ditch and passing a small portion of the water with the seeds which have been removed into another section, which contains the sieves or screens which finally remove and retain the seeds until the device can be cleaned out by hand.

In connection with the above, it comprises means contained in the first screening portion of the device, whereby the screens therein employed may be positively cleaned of their retained seeds and the latter be discharged into the final screening portion of the device.

The particular features of my invention which are new and upon which I desire a patent will be specifically set forth in the claims appended to this specification.

The accompanying drawings show a device which illustrates my invention in an approved form of construction.

Figure 1:
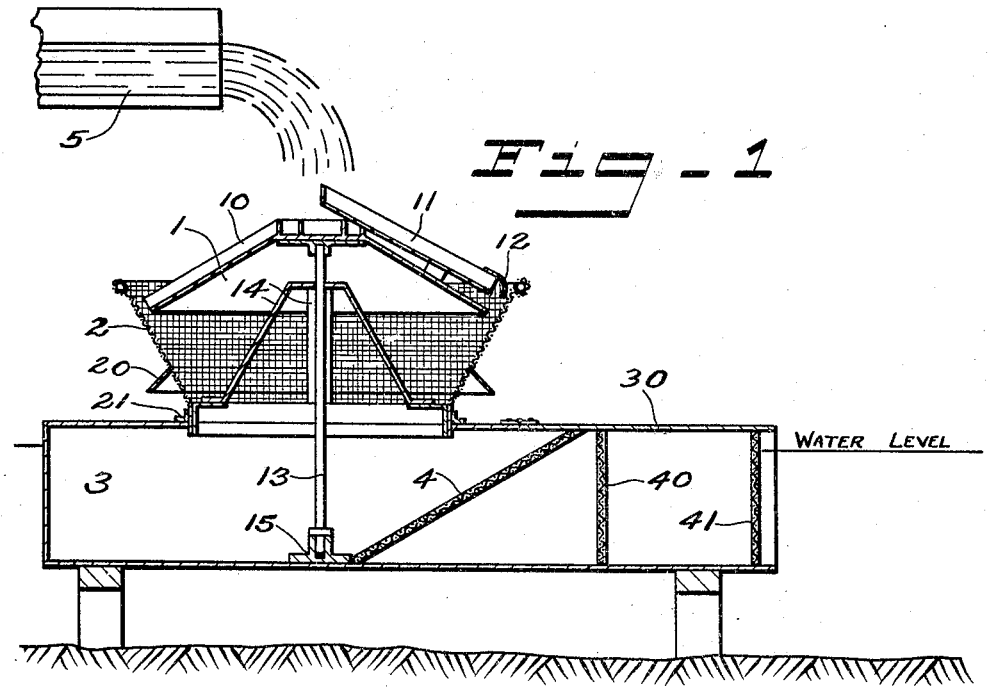
Figure 1 is a vertical section taken on a central plane extending through and lengthwise of the device.
Figure 2:
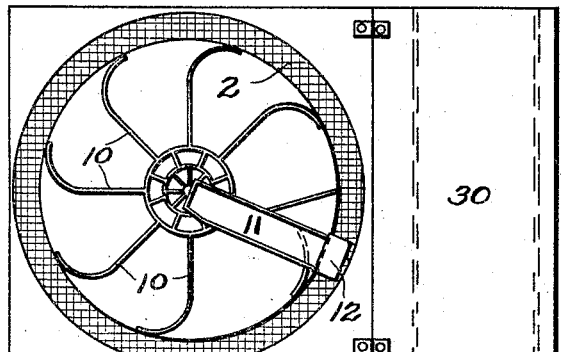
Figure 2 is a top or plan view of the screening device.
Figure 3:
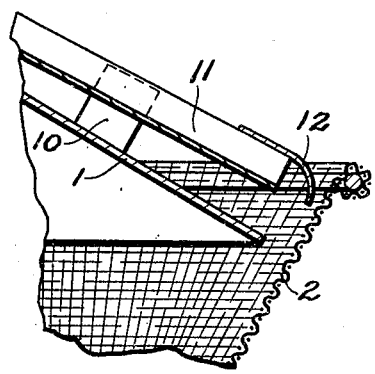
Figure 3 is a vertical section showing in detail on a somewhat larger scale, that portion of the device which is designed for washing the first or preliminary screen.

My device employs a box-like chamber 3 which is designed to be immersed in the water of the receiving ditch, flume or channel, to a point slightly below its upper surface. The location of the water level in the receiving ditch has been indicated in Figure 1. Mounted upon this is the preliminary screening device. This employs a screen 2 which preferably is made as an inverted frusto-conical section of screen material sufficiently fine in mesh to prevent passage of weed seeds. This is freely open at its top and bottom. Its bottom opening freely connects with the chamber of the box 3.

Mounted so that its lower outer edge is within and slightly spaced from the screen 2, is a conical deflector 1. This is made of sheet metal and is imperforate. It is mounted upon a shaft 13 which coincides with its axis and which is also mounted to turn in the axis of the screen 2. The lower end of this shaft is mounted in a bearing 15 and at its upper end it is supported in a bearing carried by arms 14.

Upon the upper surface of the conical deflector 1 are mounted a series of impeller blades 10. These are curved in such a way that water discharged on the upper surface of the deflector will cause the same to turn. The rate of turning, however, need not be fast and is preferably relatively slow.

Mounted upon the rotative deflector 1 and at a level preferably above that of the impeller blades 10, is a trough 11. The upper end of this extends sufficiently towards the center or possibly beyond the center so as to make sure that it receives a certain amount of water discharged upon the deflector at all times in the rotation thereof. At its lower or discharge end this trough 11 is provided with a deflecting blade 12 which covers a portion of the upper surface of the trough and at its outer end is turned downward so that the water discharged from the trough is discharged downward over the surface of the screen 2. The purpose of this is to wash from the screen 2 whatever seeds may have been deposited thereon by the flow of the water outward through the screen. The intention is to wash all such seeds downward into seed collecting and retaining chamber 3.

The chamber 3 is covered on its upper surface so as to prevent all entrance of water thereto excepting for the opening which communicates with the interior of the screen 2. The screen 2 is mounted so that its lower edge is slightly above the level of the top of the box 3, as by the use of a slight frame ring 21. The screen 2 is also preferably provided with a coned ring 20 of sheet metal, which serves as a petticoat to deflect water passing through the upper portion of the screen outwardly. It is desired that all water passing through the screen 2 be deflected away from and so as not to pass through the chamber 3. The water passing through the chamber 3 should be but a small percentage of the water discharged upon the deflector 1.

Within the chamber 3 are mounted screens as 4, 40, and 41, through which the water successively passes. These screens may be made of successively finer mesh so that finer weed seeds will pass through the first of these and be caught by later ones. The box 3 is provided with a door or cover section 30, removable so that the screens therein are accessible and may be removed for cleaning when desired.

The water handled by this device should be discharged upon the top of the deflector as by the use of a section of flume 5. The greater portion of the water will pass through the screen 2 and as this is washed by that portion of the water which is caught by the trough 11, it is prevented from retaining any large amount of the seeds and other débris which the water may contain. These are washed downward into the chamber 3 and are caught and retained by the screens placed therein.

What I claim as my invention is:

1. A seed screen for irrigation water comprising a conical deflector mounted to turn upon its axis and having blades upon its top curved to produce rotation of the deflector by the action of water pouring thereon, and a screen of circular outline surrounding and spaced slightly from the outer periphery of the deflector.

2. A seed screen for irrigation water comprising a conical deflector having its axis vertical and mounted to turn upon its axis, blades mounted on the upper side of the deflector and curved to act as impellers to turn the deflector when water is discharged thereon, a circular screen body surrounding the deflector and extending above its discharge edge, a chamber into which the bottom of said circular screen discharges, seed collecting screens extending across the discharge from said chamber, and means for discharging the water which passes through the first named screen directly into the receiving ditch.

3. A seed screen for irrigation water comprising a coned deflector mounted to turn upon its vertical axis and having curved impeller blades on its upper side whereby water discharged thereon will turn it, a screen of inverted frusto-conical shape surrounding said deflector and receiving the water discharged therefrom, a trough mounted upon the deflector and having a deflector covering its discharge end and curved to direct the discharged water downward over the surface of the screen to thereby wash collected débris downward, a seed collecting chamber upon which said deflector and screen are mounted, said chamber being closed to deflect outward the water which passes through the said screen and freely connected with the interior of the said screen, and seed retaining screens controlling the discharge from said chamber.

4. A seed screen for irrigation water comprising an inverted frusto-conical screen, a conical deflector mounted to turn within the upper part of said screen, means for delivering the water upon said deflector, a seed collecting chamber receiving the seeds and the water which does not pass through said conical screen, and collecting screens in said chamber, said collecting screens being mounted for easy removal and cleansing.

5. A seed screen for irrigation water comprising a screen of inverted frusto-conical shape, a seed retaining chamber with which the lower end of said screen communicates, a screened outlet for said chamber, a deflecting distributor discharging the water to be screened upon the upper part of said conical screen, means for discharging the water which passes through said conical screen into the receiving ditch without passing it through the seed retaining chamber, and means for directing a portion of the water over the conical screen to wash seeds stopped thereby into the seed retaining chamber.

Signed at Boise, Ada County, Idaho, this 18th day of April 1925.

RICHARD D. HELLER.